United States Patent
Chao

(10) Patent No.: US 7,029,193 B1
(45) Date of Patent: Apr. 18, 2006

(54) MINIDRIVE PEN WITH LASER AND ILLUMINATING FUNCTION

(76) Inventor: Henry Chao, P.O. Box No. 6-57, Junghe, Taipei 235 (TW)

( * ) Notice: Subject to any disclaimer, the term of this patent is extended or adjusted under 35 U.S.C. 154(b) by 0 days.

(21) Appl. No.: 11/068,740

(22) Filed: Mar. 2, 2005

(51) Int. Cl.
  B43K 29/00 (2006.01)
  B43K 5/16 (2006.01)
(52) U.S. Cl. .............. 401/195; 362/118; 362/259
(58) Field of Classification Search ............ 401/52, 401/194, 195; 362/118, 259; 439/135, 149
  See application file for complete search history.

(56) References Cited

U.S. PATENT DOCUMENTS 5,335,150 A * 8/1994 Huang ............... 362/118
6,773,192 B1 * 8/2004 Chao ............... 401/195
6,932,276 B1 * 8/2005 Liu ............... 401/195

\* cited by examiner

Primary Examiner—Tuan Nguyen

(57) ABSTRACT

A minidrive pen with laser and illuminating function includes an upper and a lower pen barrel and an adapter, wherein a minidrive circuit board is configured within the upper pen barrel, and which is connected to a USB (Universal Serial Bus) connector. Two orifices are defined in a bottom extremity of the lower pen barrel. Furthermore, a laser element, an illuminating element and a battery compartment are configured within the lower pen barrel. Switches are configured in a surface of the lower pen barrel. After disposing batteries in the battery compartment, the upper pen barrel and the lower pen barrel are joined together by means of the adapter. Furthermore, electric conduction is also effectuated by means of the adapter, thereby constituting a easy carrying of the minidrive, and simultaneously achieving effectiveness of a laser pointer and illumination.

3 Claims, 6 Drawing Sheets

MINIDRIVE PEN WITH LASER AND ILLUMINATING FUNCTION

BACKGROUND OF THE INVENTION (a) Field of the Invention

The present invention relates to a minidrive pen with laser and illuminating function, and more particularly to a minidrive pen structure that provides for easy portability of a minidrive, and moreover, embodies a laser pointer and illuminating feature.

(b) Description of the Prior Art

From the time minidrives were successfully developed, storage of data has become exceptionally convenient, and thus the minidrive has been favorably welcomed by consumers. However, design of current minidrives is such that an electric circuit is usually disposed within a housing, while a USB (Universal Serial Bus) connector protrudes from the housing, and when not in use, a cover is placed on top of the USB (Universal Serial Bus) connector portion. Because such conventional minidrive products are usually placed in a pocket when not in usage, loss of such easily occurs. Hence, some persons hang the minidrive round their neck. However, regardless of whether the minidrive is placed in the pocket or hung round the neck, inconvenience in carrying the minidrive is still present, and is assuredly a shortcoming of such a high technological product, and thus there is a need for manufacturers to further improve on the design of such conventional minidrives.

SUMMARY OF THE INVENTION

A primary objective of the present invention is to provide a minidrive pen with laser and illuminating function, which benefits portability of a minidrive, and moreover, simultaneously provides functionality of a laser pointer and illumination.

Structure of the aforementioned minidrive pen comprises an upper and a lower pen barrel and an adapter. A minidrive circuit board is configured within the upper pen barrel, and which is connected to a USB (Universal Serial Bus) connector. The USB (Universal Serial Bus) connector is configured to protrude from the upper pen barrel. Two orifices are defined in a bottom extremity of the lower pen barrel, and a circuit board and a battery compartment are configured within the lower pen barrel. A laser element and an illuminating element are connected to the circuit board of the lower pen barrel, wherein the illuminating element protrudes from one of the orifices defined in the bottom extremity of the lower pen barrel. Switches are configured in a surface of the lower pen barrel. After disposing batteries in the battery compartment, the upper pen barrel and the lower pen barrel are joined together by means of the adapter. Furthermore, electric current from the batteries flows through laser and illuminating circuits by means of the adapter, and therewith constitutes a minidrive pen, which realizes easy carrying of the minidrive. Switching on of the laser and illuminating elements by pressing the switches thereby achieves effectiveness of the laser pointer and illumination.

Regarding the aforementioned structure of the minidrive pen, wherein a spring is further configured on the laser and illuminating circuits, and one end of the spring provides for bracing a negative terminal of one of the batteries, while a positive terminal of another of the batteries connects to the circuit board of the lower pen barrel by means of conduction of current flow between the adapter and the lower pen barrel, thereby constituting transmission of electric power.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
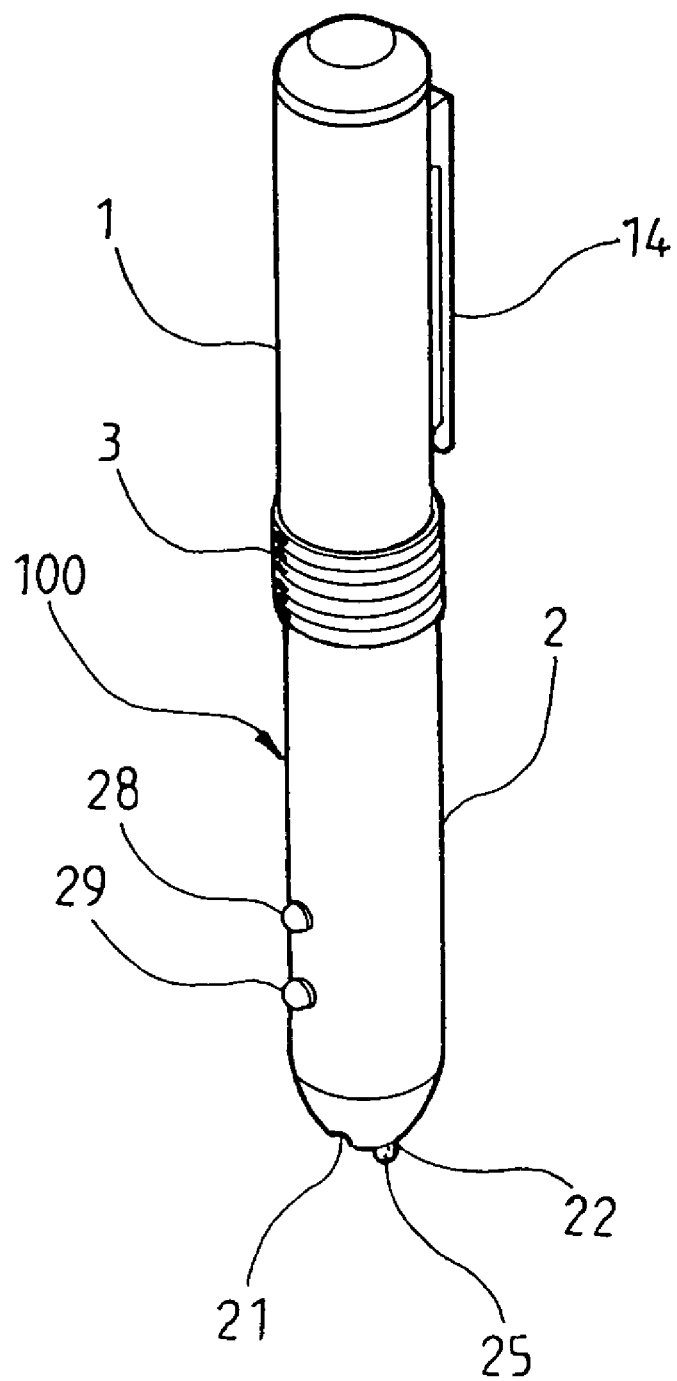
FIG. 1 shows an elevational view according to the present invention.
Figure 2:
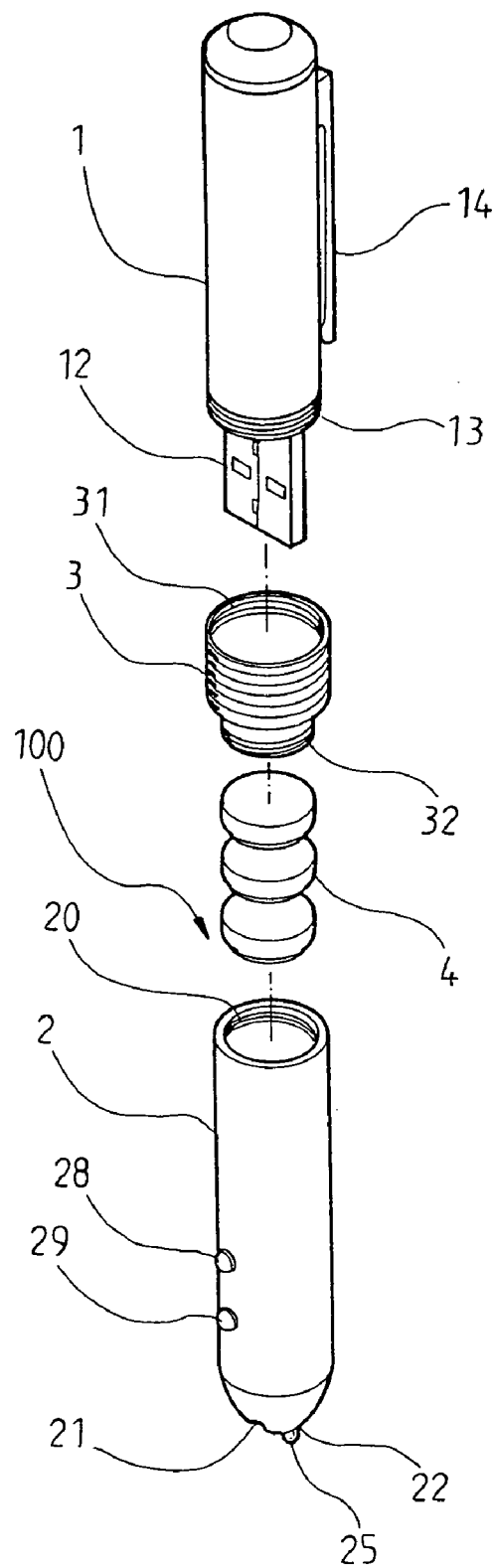
FIG. 2 shows an exploded elevational view according to the present invention.
Figure 3:
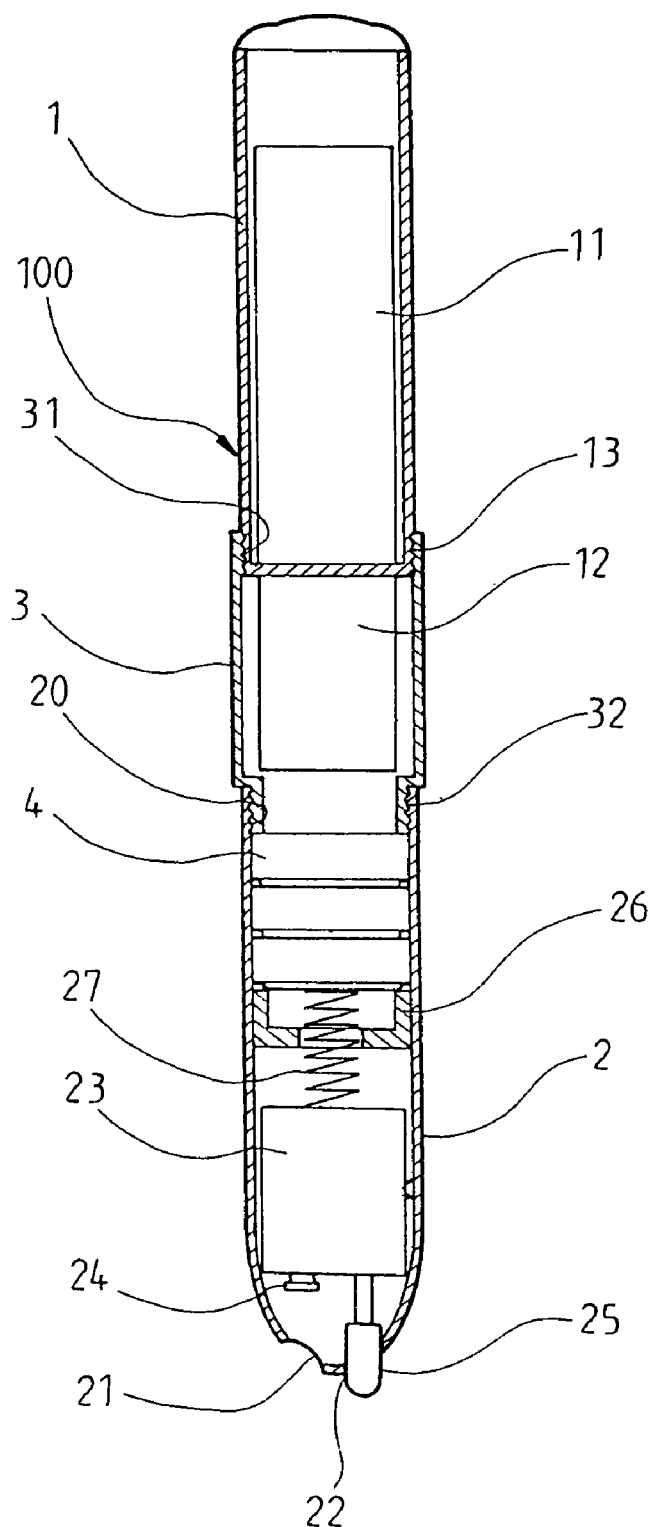
FIG. 3 shows a cross-sectional view according to the present invention.

Referring to FIGS. 1, 2, and 3, which show an elevational view, an exploded elevational view and a cross-sectional view respectively according to the present invention. The present invention primarily comprises an upper pen barrel 1, a lower pen barrel 2 and an adapter 3. Wherein a minidrive circuit board 11 is disposed within the upper pen barrel 1, and the minidrive circuit board 11 connects to a USB (Universal Serial Bus) connector 12, which protrudes from a bottom extremity of the upper pen barrel 1. Screw teeth 13 are configured on an outer edge of the bottom extremity of the upper pen barrel 1; moreover, a clip 14 is configured on an external surface of the upper pen barrel 1.

A screw thread 20 is configured on an inner edge of a top extremity of the lower pen barrel 2, and two orifices 21 and 22 are defined in a bottom extremity of the lower pen barrel 2. A circuit board 23 is disposed within the lower pen barrel 2, and the circuit board 23 connects to a laser element 24 and an illuminating element 25 (a bulb or a L.E.D. (light emitting diode)), moreover, the illuminating element 25 protrudes external of the orifice 22. A battery compartment 26 is configured above the circuit board 23, moreover, switches 28 and 29 are configured on the circuit board 23, and the switches 28 and 29 protrude from a surface of the lower pen barrel 2.

The adapter 3 assumes a hollow state, and diameter of a bottom end of the adapter 3 is configured to be relatively smaller than that of a top end. A screw thread 31 and screw teeth 32 are configured on an inner edge of the top end and an outer edge of the bottom end of the adapter 3 respectively.

Regarding assemblage of the aforementioned structural members, wherewith, after batteries 4 have been disposed within the battery compartment 26, thereupon the bottom end of the adapter 3 is screwed tight onto the top end of the lower pen barrel 2, whereafter the upper pen barrel 1 is screwed tight onto the top end of the adapter 3, thereby assembling a minidrive pen 100 thereof, and which can be clipped onto a pocket or other locations on clothing by means of the clip 14. Such a configuration thereby benefits portability thereof. Upon needing to use the minidrive pen, the upper pen barrel 1 is simply unscrewed from the lower pen barrel 2, effectuating considerable convenience. Voltage supplied by the batteries 4 is transmitted to the circuit board 23 of the lower pen barrel 2 by means of a spring 27 and conduction of current flow between the adapter 3 and the lower pen barrel 2, thereby constituting transmission of electric power. The switches 28 and 29 are thus enabled to actualize switching on of the laser element 24 and the illuminating element 25 respectively, thus realizing functionality of a laser pointer and illumination.

Figure 4:
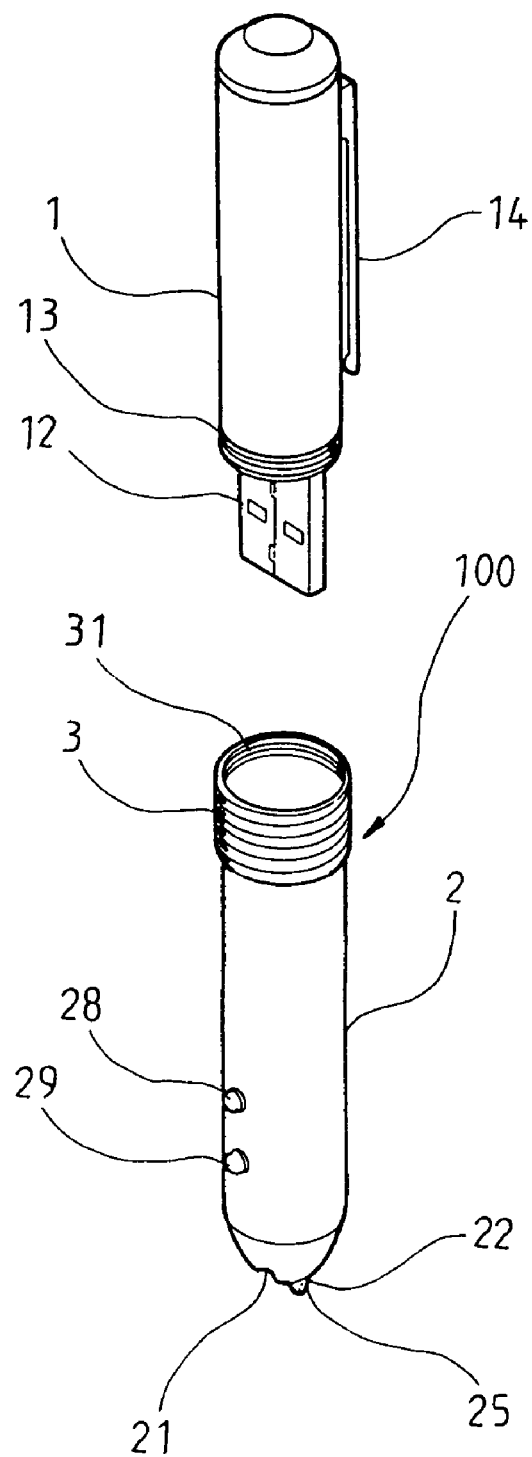
FIG. 4 shows an elevational view of an embodiment of a minidrive in usage according to the present invention.

Referring to FIG. 4, which shows an embodiment of the minidrive of the present invention in usage, whereby upon wishing to use the minidrive, the upper pen barrel 1 is unscrewed from the adapter 3, and the minidrive thereupon forms an independent entity, which can be plugged into a computer, thus enabling the computer to read or store data within the minidrive, whereas, when not in usage, the minidrive can be tightened back onto the adapter 3 thereof, and the clip 14 facilitates convenient clipping onto clothing, thereby benefiting portability of the minidrive and preventing loss thereof.

Figure 5:
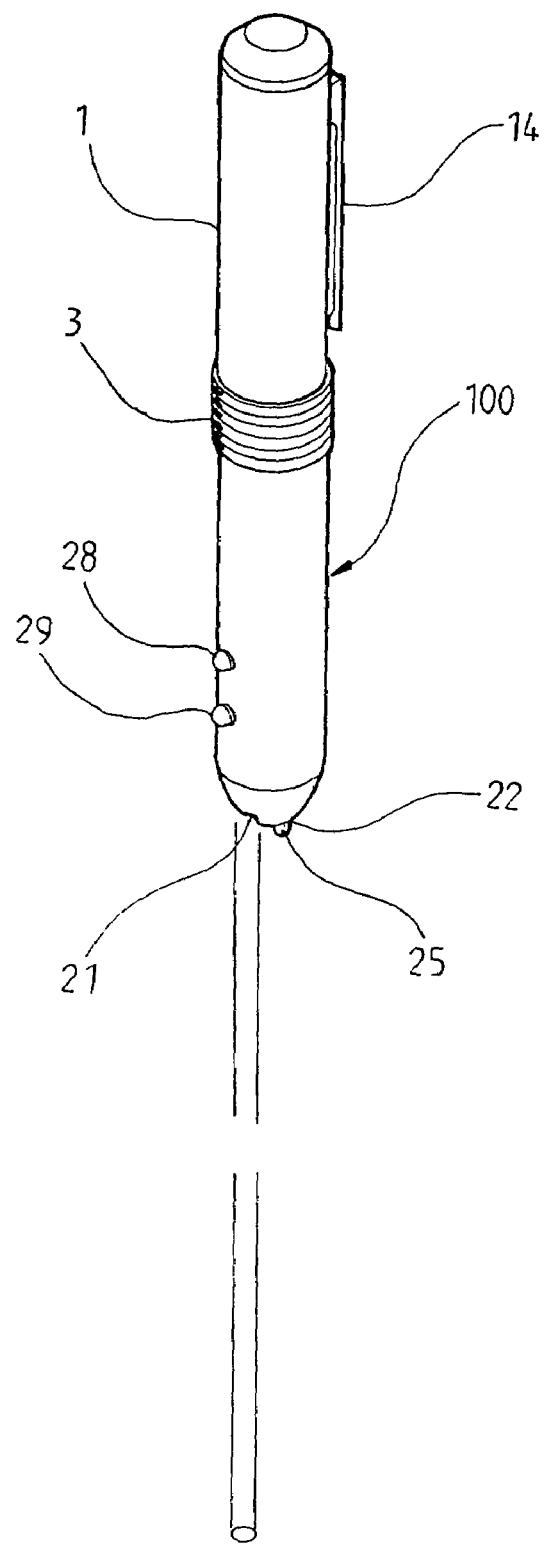
FIG. 5 shows an elevational view of an embodiment depicting a laser pointer function according to the present invention.
Figure 6:
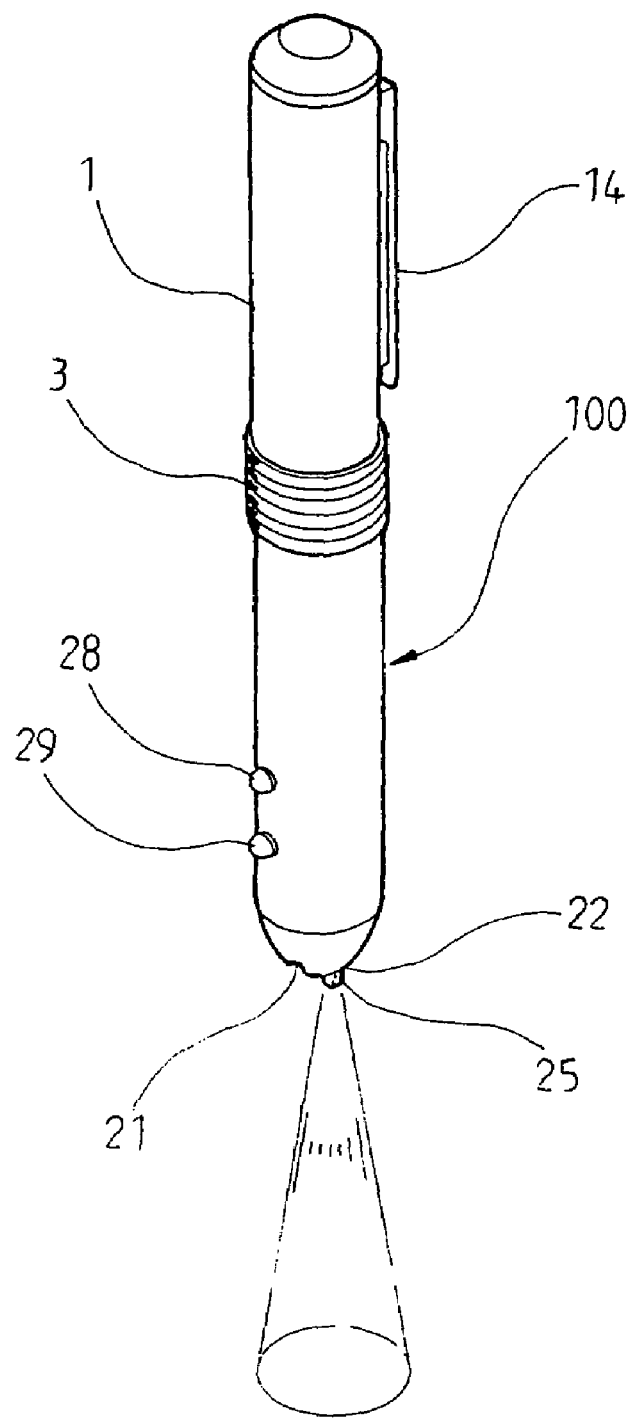
FIG. 6 shows an elevational view of an embodiment depicting illuminating function according to the present invention.

Referring to FIGS. 5 and 6, which show other embodiments of the present invention depicting illuminating functionality and laser pointer functionality respectively, whereby pressing on the switches 28 and 29 effectuates switching on of the laser element 24 and the illuminating element 25 of the present invention. Wherein, the laser irradiates outward through the orifice 21, thereby achieving functionality of the laser pointer, and the illuminating element 25 achieves illuminating function for use in dark places, thereby enhancing practical value of the minidrive pen 100.

In conclusion, the present invention joins the upper and lower pen barrels by means of the adapter, thereby realizing portability of the minidrive, and moreover, simultaneously provides functionality of the laser pointer and illumination, thus achieving practicability. The present invention is assuredly provided with originality and advancement. Accordingly, a patent application is proposed herein.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A minidrive pen with laser and illuminating function, comprising:

an upper pen barrel, wherein a minidrive circuit board is disposed, and the minidrive circuit board connects to a USB (Universal Serial Bus) connector, which protrudes from a bottom extremity of the upper pen barrel, moreover, screw teeth are configured on an outer edge of the bottom extremity of the upper pen barrel;

a lower pen barrel, wherein two orifices are defined in a bottom extremity of same, moreover, a screw thread is configured on an inner edge of a top extremity of the lower pen barrel, and a circuit board and a battery compartment are further configured within the lower pen barrel;

the circuit board, upon which is configured a laser element and an illuminating element, and one side of the circuit board connects to an inner edge of the lower pen barrel, moreover, one extremity of a spring is connected to a top edge of the circuit board, and the spring is so configured to penetrate an opening in the battery compartment;

an adapter, which assumes a hollow state, and diameter of a bottom end of the adapter is configured to be relatively smaller than that of a top end, a screw thread and screw teeth are configured on an inner edge of the top end and an outer edge of the bottom end of the adapter respectively;

regarding assemblage of the aforementioned structural members, wherewith, after batteries have been disposed within the battery compartment, thereupon the bottom end of the adapter is screwed tight onto the top end of the lower pen barrel, whereafter the upper pen barrel is screwed tight onto the top end of the adapter, thereby assembling a minidrive pen thereof, and which benefits portability thereof, moreover, the laser element and the illuminating element can be switched on by means of switches, thus realizing functionality of a laser pointer and illumination.

2. The minidrive pen with laser and illuminating function according to claim 1, wherein the illuminating element of the circuit board configured within the lower pen barrel protrudes from one of the orifices defined in the bottom extremity of the lower pen barrel, thereby benefiting illumination therewith.

3. The minidrive pen with laser and illuminating function according to claim 1, wherein the illuminating element of the circuit board configured within the lower pen is an L.E.D (light emitting diode) or bulb or similar light-emitting element.

* * * * *